(12) United States Patent
Li et al.

(10) Patent No.: US 7,751,777 B2
(45) Date of Patent: Jul. 6, 2010

(54) SYSTEM AND METHOD FOR TRANSMITTING DATA IN A COMMUNICATION NETWORK

(75) Inventors: Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 467 days.

(21) Appl. No.: 11/855,569

(22) Filed: Sep. 14, 2007

(65) Prior Publication Data

US 2009/0075586 A1 Mar. 19, 2009

(51) Int. Cl.
*H04B 3/36* (2006.01)
*H04B 7/14* (2006.01)
*H04B 1/60* (2006.01)
*H04B 17/02* (2006.01)
*H04B 1/00* (2006.01)
*H04B 15/00* (2006.01)

(52) U.S. Cl. ............... 455/7; 455/9; 455/15; 455/63.1
(58) Field of Classification Search ............... 455/7, 455/8, 9, 16, 507, 524, 525, 63.1, 67.11, 455/67.14, 11.1, 13.1, 15

See application file for complete search history.

(56) References Cited

U.S. PATENT DOCUMENTS

| 5,365,516 | A | * | 11/1994 | Jandrell | 370/335 |
| 7,110,715 | B2 | * | 9/2006 | Gupta | 455/11.1 |
| 7,542,734 | B2 | * | 6/2009 | Piirainen | 455/101 |
| 7,593,688 | B2 | * | 9/2009 | Pratt et al. | 455/7 |

\* cited by examiner

*Primary Examiner*—Eugene Yun
(74) *Attorney, Agent, or Firm*—Grossman, Tucker, Perreault & Pfleger, PLLC

(57) ABSTRACT

Disclosed is a system and method for transmitting data from a first base station to a first destination subscriber station (DSS). The first base station is capable of transmitting data directly to the first DSS through a direct route. Co-channel interference is present at neighboring cells during the transmission of the data through the direct route. The method includes selecting a relay station from a plurality of relay stations for transmitting data to the first DSS via a relay route. The relay route includes a route from the first base station to the relay station and further from the relay station to the first DSS. A height of the relay station is lower than a height of the first base station. Further, the method includes transmitting the data through the relay route when a throughput of the relay route is greater than a throughput of the direct route by a predetermined threshold.

12 Claims, 3 Drawing Sheets

SYSTEM AND METHOD FOR TRANSMITTING DATA IN A COMMUNICATION NETWORK

FIELD

The present disclosure generally relates to a method for transmitting data in a communication network, and, more particularly, to transmitting data in the communication network using a relay station, thereby reducing a co-channel interference in the communication network.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

Figure 1:
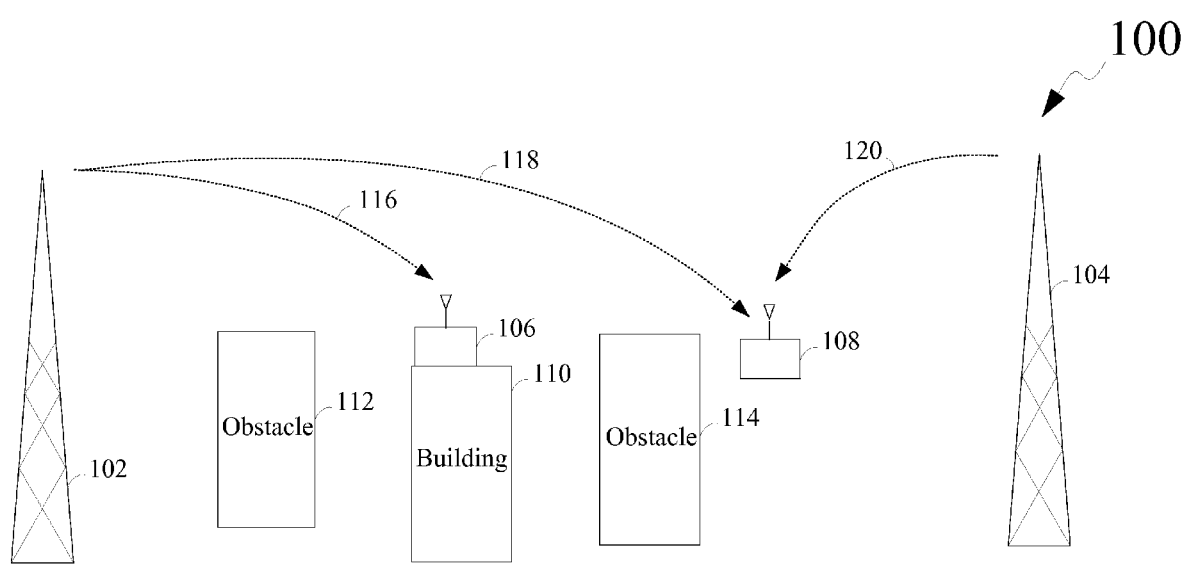
FIG. 1 is a schematic diagram for transmitting data in a traditional communication network.

For a thorough understanding of the present disclosure, reference is to be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The present disclosure provides a system and method for transmitting data in a communication network. The communication network includes a base station that identifies a co-channel interference from a neighboring cell due to a direct transmission of the data from the base station or a relay station to destination subscriber stations (DSSs). Further, the present disclosure provides a solution to mitigate this co-channel interference by using a plurality of relay stations corresponding to the base station.

The transmission of the data in a communication network utilizes various technologies, for example, worldwide interoperability for microwave access (WiMAX), wireless metropolitan area network (WMAN), and the like. Such technologies allow broadband wireless access in the communication network. For example, the WiMAX allows broadband internet access from fixed and mobile devices via antennas. The WiMAX may provide broadband wireless access up to 30 miles for fixed devices; and about 3 to about 10 miles for mobile devices in the communication network.

To provide wireless access in the communication network, a geographical area covered by the communication network may be divided into cells. Each cell includes a base station for the transmission of the data. However, frequency band available for the transmission of data in the communication network is limited. Moreover, the data transmission requires a high bandwidth per cell (for example, 5 or 10 MHz). The base stations may use the same frequency band, i.e. a reuse factor of 1. This leads to strong co-channel interference for destination subscriber stations (DSSs) when the DSSs receive signals from more than one base station at a time. For example, a DSS located at an edge of a cell may receive a signal from a base station corresponding to the cell; while at the same time, the DSS may also receive another signal from a base station of an adjacent cell. The signal from the base station of the adjacent cell may be considered unwanted and causes a co-channel interference at the DSS. The presence of co-channel interference at a DSS is described further in conjunction with FIG. 1.

FIG. 1 is a schematic diagram for transmitting data in a traditional communication network 100. The communication network 100 includes a first base station 102, a second base station 104, a first DSS 106, and a second DSS 108. Further, a geographical area covered by the communication network includes one or more high altitude buildings, for example, a building 110, and one or more obstacles, for example, an obstacle 112 and an obstacle 114. However, the present disclosure is not limited to such geographic situation.

The first base station 102 has a line-of-sight (LOS) path with the first DSS 106. Accordingly, the first base station 102 is capable of transmitting data to the first DSS 106 through a direct route 116. The first base station 102 has a high antenna mounting and the transmission of data from the first base station 102 to the first DSS 106 causes strong co-channel interference at the neighboring cells. The first DSS may be located at the top of the high altitude building 110, and the second DSS 108 may be located at an edge of a cell (also referred to as a DSS located at a cell edge). Accordingly, the transmission of data from the first base station 102 to the first DSS 106 through a direct route (as shown by 116 in FIG. 1) may cause strong co-channel interference (as shown by 118 in FIG. 1) to the data transmission to the second DSS 108 from the second base station 104 (as shown by 120 in FIG. 1).

The co-channel interference during the transmission of data in a communication network should be at a minimum in order to increase the amount of data transferred per unit time, which is measured in terms of throughput. The more the throughput (or capacity), the better the quality of transmission. The method of the present disclosure provides an increase in the throughput during data transmission by using a relay station. The system and method is described below in conjunction with FIG. 2.

Figure 2:
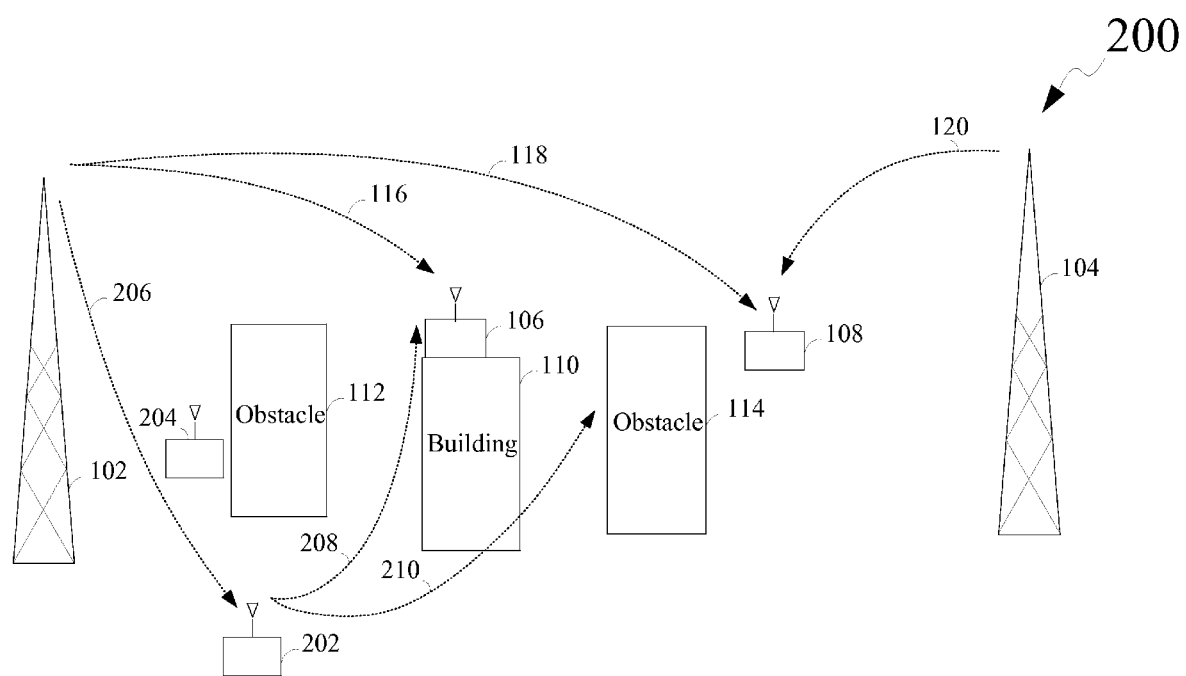
FIG. 2 is a comparison between the tradition single hop transmission and a schematic diagram for transmitting data in a communication network, according to an exemplary embodiment of the present disclosure.

FIG. 2 is a schematic diagram for transmitting the data in a communication network 200, according to an exemplary embodiment of the present disclosure. The communication network 200 includes: the first base station 102; the second base station 104; the first DSS 106; the second DSS 108; and a plurality of relay stations corresponding to the first base station 102, for example, a relay station 202 and a relay station 204. The description below with regard to the embodiment in FIG. 2 particularly addresses the transmission of data from the first base station 102 to the first DSS 106.

As used herein, a relay station (for example, the relay station 202 and the relay station 204) can increase the throughput of the communication network 200 by increasing a power of a signal corresponding to the data transmitted. Also, as illustrated in FIG. 2, the relay station 202 and the relay station 204 have a height lower than a height of the first base station 102. More specifically, the relay station 202 and the relay station 204 have a lower antenna height (i.e., a lower antenna mounting) than the antenna height of the first base station 102. Without being bound by theory, a device with a lower antenna height tends to have a greater path loss (exponent) than a device with a greater antenna height. Accordingly, the relay station 202 with a lower height than the first base station 102 will have a greater path loss. When the first base station 102 sends signals directly to the first DSS 106, the signals from the first base station 102 may cause a significant amount of co-channel interference to the data transmission in a neighboring cell (herein the DSS 108) because the high antenna mounting at the first base station 102 leads to slow signal decay along a propagation path.

Due to presence of relay stations in the communication network 200, the first base station 102 may send the signal to the first DSS 106 via a relay station (for example, the relay station 202) far from the cell edge. Such a transmission through the relay station 202 is referred herein as transmission through a relay route. More specifically, the transmission through the relay route includes a transmission from the first base station 102 to the relay station 202 (shown by 206) and further from the relay station 202 to the first DSS 106 (shown by 208). The data transmission using the lower antenna height of the relay station leads to a faster decay of the relay signal (as shown by 208 and 210 in FIG. 2) than in the case of the direct signal (shown by 118), thereby resulting in a low interference level to stations in a neighboring cell e.g. DSS 108. It is noted that the transmission 206 has an associated co-channel interference, shown by 118 to the DSS 108. And its level of interference would be similar to that from direct transmission except that the power of transmission of 206 can be lower due to close proximity of BS 102 and relay station 202. Alternatively, the transmission duration of 206 may be shorter if the power level is kept constant. In any case, the co-channel interference to DSS 108 can be lowered using a low antenna from relay station. Accordingly, a high network throughput may be achieved.

The relay stations (herein the relay station 202 and the relay station 204) corresponding to the first base station 102 have a LOS path between each relay station and the first base station 102. A relay station from the plurality of relay stations is selected based on a presence of a LOS path between the relay station and the first DSS 106. For example, for transmission of data to the first DSS 106 via the relay route, the first base station 102 may select the relay station 202, instead of the relay station 204. This is due to the presence of a LOS path for transmission of data from the relay station 202 to the first DSS 106 (shown by 208), which is not available in case of the relay station 204, due to presence of the obstacle 112. Such a transmission of data from the relay station 202 has lower attenuation as compared to the transmission of the data from the relay station 204. Accordingly, when the data is transmitted through the relay station 202, the co-channel interference may be reduced. Additionally, the transmission of data by the low height antenna of the relay station 202 to the first DSS 106 is more easily blocked by obstacles (for example, the obstacle 114). This is illustrated by line 210 in the FIG. 2. As a result, the co-channel interference is reduced when the data is transmitted through the relay station 202.

Figure 3:
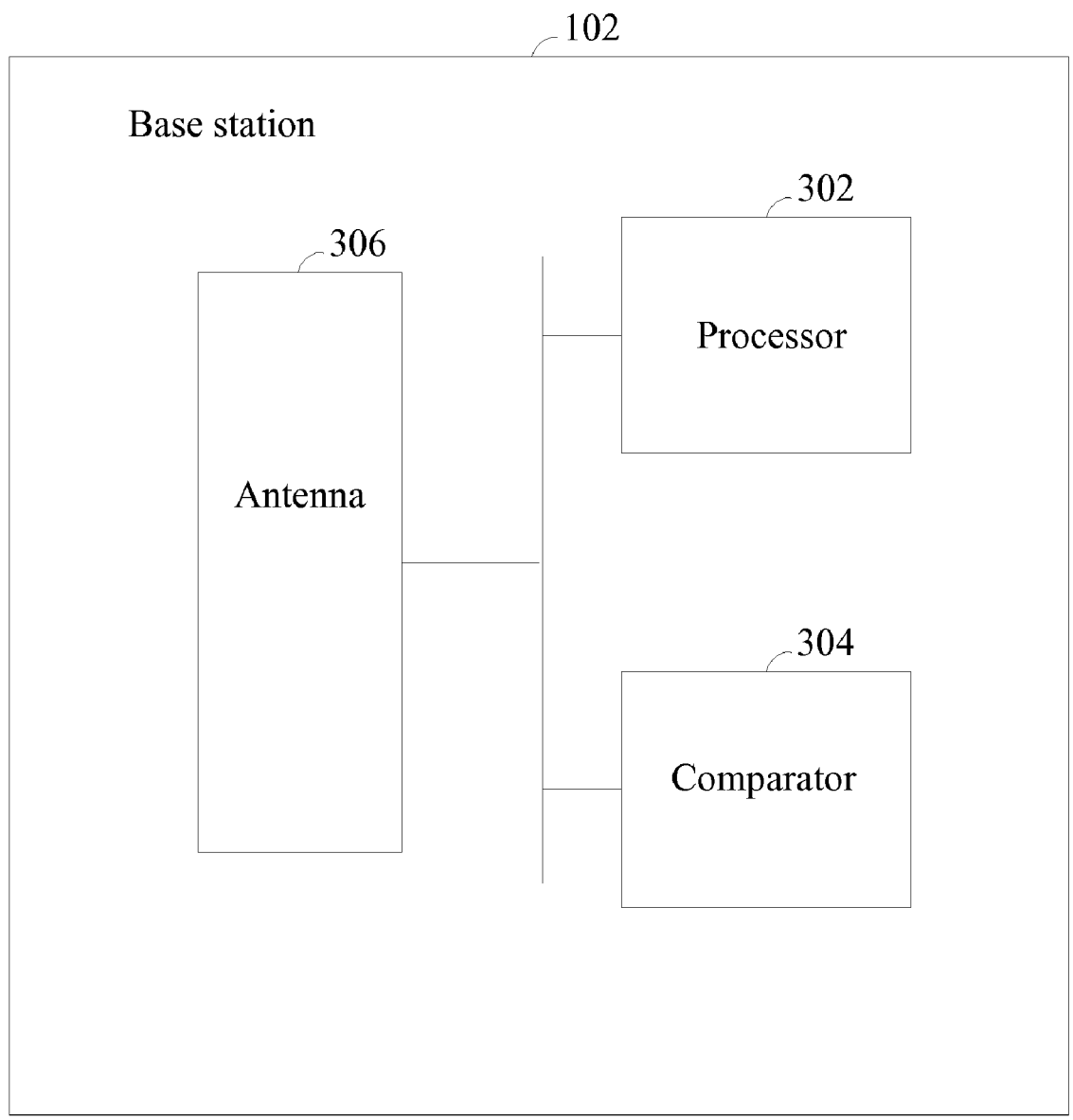
FIG. 3 is a block diagram illustrating a first base station, according to an exemplary embodiment of the present disclosure.

FIG. 3 is a block diagram illustrating a base station (herein after referred as the first base station 102), according to an exemplary embodiment of the present disclosure. The first base station 102 includes a processor 302, a comparator 304, and an antenna 306. The processor 302 is capable of determining co-channel interference at the second DSS 108 when the data is transmitted from the first base station 102 to a DSS, for example, the first DSS 106, based on a predetermined input from the first DSS 106. Feedback may be utilized in determining the co-channel interference at the second DSS 108.

In one embodiment, the predetermined input from the first DSS 106 is a signal to interference ratio (SIR) of the first DSS 106. The SIR may be obtained from a channel quality feedback. The channel quality feedback reports the SIR seen at a DSS, for example, at the first DSS 106. A DSS with a large SIR is likely to cause strong co-channel interference on data transmission in the adjacent cells if the data is sent directly by the first base station 102 to the first DSS 106 through the direct route 116. In another embodiment, the predetermined input from the first DSS 106 is a channel quality index (CQI) of a signal corresponding to the data. The CQI indicates a signal quality at a DSS. A DSS with low signal quality is likely to be at an edge of a cell. The signal quality may also be measured by a signal detection of the data sent to the first DSS 106.

Thereafter, the processor 302 selects a relay station from the plurality of relay stations (herein the relay station 202 and the relay station 204) for transmitting the data via a relay route. The processor 302 selects a relay station from the plurality of relay stations corresponding to the first base station 102 based on the presence of a LOS path between the relay station and the first DSS 106. For example, when the processor 302 identifies that the first DSS 106 requires a relay station for the transmission of data, the processor 302 selects the relay station 202 instead of the relay station 204 due to the presence of the LOS path between the first base station 102 and the first DSS 106 (shown by 208). Accordingly, the data is transmitted via the relay station 202.

Further, the processor 302 determines a throughput of the direct route 116 and a throughput of the relay route for transmitting the data. Thereafter, the processor 302 determines a predetermined threshold based on a throughput gain of the communication network. The throughput gain may be calculated from the throughput of the relay route and the throughput of the direct route. In one embodiment, the processor 302 determines the predetermined threshold based on an overhead for transmitting the data through the relay route. The overhead may include information added at the beginning and at the end of data. Suitable information includes system operation and maintenance information, for example, a control information, a routing information, an error-checking information, and the like.

As discussed herein, the processor 302 is capable of performing the above mentioned functionalities. However, it should be obvious to a person ordinarily skilled in the art that the above mentioned functionalities may be performed separately by a plurality of processors, instead of being performed by a single processor.

The comparator 304 is operatively coupled to the processor 302. The comparator 304 is capable of comparing the throughput of the relay route with the throughput of the direct route 116. The antenna 306 is operatively coupled to the processor 302 and the comparator 304. When the throughput of the relay route is greater than the throughput of the direct route 116 by a predetermined threshold, the antenna 306 sends the data to the relay station 202 for transmission of data via the relay route. The antenna 306 sends the data from the first base station 102 to the first DSS 106 through the direct route 116 when the throughput of the relay route is less than the throughput of the direct route.

It will be evident to a person skilled in the art that the first base station 102 may include the requisite electrical circuits and connections to connect the processor 302, the comparator 304, and the antenna 306.

The present disclosure provides a method for transmission of data in a communication network when co-channel interference is taken in to account. For example, the system capacity of a WMAN may be limited by co-channel interference. Accordingly, the proposed method enables mitigation of strong co-channel interference by utilizing a low antenna height of a relay station. The lower height of the relay station can mitigate the co-channel interference by utilizing the information on the difference level of co-channel interference from different relay routes. The reduction of the overall co-channel interference may be based on the higher attenuation of the signal transmitted from the shorter relay station to the destination station via the relay route. A further simplification of the relay station selection from the plurality of relay stations may be based on criteria that the relay route has a high channel capacity or data rate. For example, the selected relay station has a LOS with the base station and the DSS. Accordingly, a relay route quality can be maintained by selecting a relay station from multiple relay stations with good route quality. Accordingly, a high spectrum efficiency of WMAN may be achieved.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method for transmitting data in a communication network, the communication network comprising a first base station capable of transmitting data to a first destination subscriber station (DSS), and a second base station capable of transmitting data to a second DSS, wherein a co-channel interference is present at the second DSS during a transmission of the data from the first base station to the first DSS through a direct route, the method at the first base station comprising:
    selecting a relay station from a plurality of relay stations corresponding to the first base station for transmitting the data via a relay route, wherein the relay route comprises a route from the first base station to the relay station and further from the relay station to the first DSS, and wherein a height of the relay station is lower than a height of the first base station; and
    transmitting the data through the relay route when a throughput of the relay route is greater than a throughput of the direct route by a predetermined threshold.

2. The method of claim 1, wherein the co-channel interference is determined based on a predetermined input from the first DSS.

3. The method of claim 2, wherein the predetermined input from the first DSS is at least one of a signal to interference ratio (SIR) of the first DSS and a channel quality index (CQI) of a signal corresponding to the data.

4. The method of claim 1, wherein selecting the relay station from the plurality of relay stations is based on a presence of a line-of-sight (LOS) path between the final relay station and the first DSS.

5. The method of claim 1, wherein the predetermined threshold is based on an overhead for transmitting the data through the relay route.

6. The method of claim 1, wherein the predetermined threshold is based on a throughput gain calculated from the throughput of the relay route and the throughput of the direct route.

7. A communication network comprising:
    a first destination subscriber station (DSS);
    a second DSS;
    a first base station capable of transmitting data to the first DSS;
    a second base station capable of transmitting the data to the second DSS, wherein a co-channel interference is present at the second DSS during a direct transmission of the data from the first base station to the first DSS through a direct route; and
    a plurality of relay stations capable of receiving the data from the first base station;
    wherein the first base station comprises
        a processor capable of
            selecting a relay station from the plurality of relay stations corresponding to the first base station for transmitting the data via a relay route, wherein the relay route comprises a route from the first base station to the relay station and further from the relay station to the first DSS, and wherein a height of the relay station is lower than a height of the first base station, and
            computing a throughput of the relay route and a throughput of the direct route,
        a comparator operatively coupled to the processor, the comparator capable of comparing the throughput of the relay route with the throughput of the direct route, and
        an antenna operatively coupled to the processor and the comparator, the antenna capable of transmitting the data through the relay route when the throughput of the relay route is greater than the throughput of the direct route by a predetermined threshold.

8. The communication network of claim 7, wherein the processor is further capable of determining the co-channel interference based on a predetermined input from the first DSS.

9. The communication network of claim 8, wherein the predetermined input from the first DSS is at least one of a signal to interference ratio (SIR) of the first DSS and a channel quality index (CQI) of a signal corresponding to the data.

10. The communication network of claim 7, wherein the processor is further capable of determining the predetermined threshold based on an overhead for transmitting the data through the relay route.

11. The communication network of claim 7, wherein the processor is further capable of determining the predetermined threshold based on a throughput gain, and wherein the throughput gain is calculated from the throughput of the relay route and the throughput of the direct route.

12. The communication network of claim 7, wherein the processor is capable of selecting the relay station based on a presence of a line-of-sight (LOS) path between the relay station and the first DSS.

* * * * *